(12) United States Patent
Smith et al.

(10) Patent No.: US 7,078,676 B2
(45) Date of Patent: Jul. 18, 2006

(54) DISPLACEMENT SENSOR APPARATUS

(75) Inventors: Toby E. Smith, Broken Arrow, OK (US); Craig L. Cooper, Inola, OK (US)

(73) Assignee: Bed-Check Corporation, Tulsa, OK (US)

(*) Notice: Subject to any disclaimer, the term of this patent is extended or adjusted under 35 U.S.C. 154(b) by 0 days.

(21) Appl. No.: 10/967,612

(22) Filed: Oct. 18, 2004

(65) Prior Publication Data

US 2005/0082466 A1    Apr. 21, 2005

Related U.S. Application Data

(60) Provisional application No. 60/524,978, filed on Nov. 25, 2003, provisional application No. 60/512,042, filed on Oct. 17, 2003.

(51) Int. Cl.
*G01J 1/04* (2006.01)
*G01D 5/34* (2006.01)

(52) U.S. Cl. .............. 250/227.11; 250/231.1; 250/227.11; 385/12

(58) Field of Classification Search ........... 250/227.11, 250/227.14, 227.15, 227.16, 227.18, 227.26, 250/227.31, 227.32, 231.1; 385/12, 13; 356/614, 356/73.1

See application file for complete search history.

(56) References Cited

U.S. PATENT DOCUMENTS

| | | | |
|---|---|---|---|
| 3,980,988 A | 9/1976 | Spizzo | |
| 4,007,733 A | 2/1977 | Celeste et al. | |
| 4,179,692 A | 12/1979 | Vance | |
| 4,295,133 A | 10/1981 | Vance | |
| 4,298,863 A | 11/1981 | Natitus et al. | |
| 4,417,572 A | 11/1983 | Green | |
| 4,432,599 A | 2/1984 | McMahon | |
| 4,484,043 A | 11/1984 | Musick et al. | |
| 4,565,910 A | 1/1986 | Musick et al. | |
| 4,608,973 A | 9/1986 | Green et al. | |
| 4,611,378 A | 9/1986 | Caserta et al. | |
| 4,700,180 A | 10/1987 | Vance | |

(Continued)

FOREIGN PATENT DOCUMENTS

GB        2020012 A        11/1979

(Continued)

OTHER PUBLICATIONS

Printed Results of NEARAC Patent Search of Nov. 6, 2003.

*Primary Examiner*—Kevin Pyo
(74) *Attorney, Agent, or Firm*—Fellers, Snider, Blakenship, Bailey & Tippens, P.C.; Terry L. Watt

(57) ABSTRACT

There is provided herein a sensor for determining relative displacement between two surfaces which utilizes two optically conductive members that have been mounted in proximity to each other, whereby the amount of displacement between the two surfaces may be determined by measurement of the magnitude of the intensity of light transmitted through them. The instant invention preferably utilizes two planar light transmitting surfaces—an emitter and a receiver—which are free to move laterally with respect to each other and are positioned so that when light is introduced into the emitter some proportion of that light falls on the receiver. By electronically monitoring the intensity of light impinging on the receiver an estimate of the amount of overlap between the two optical surfaces and, thus, an estimate of the relative displacement between them, may be obtained.

19 Claims, 5 Drawing Sheets

U.S. PATENT DOCUMENTS

| | | |
|---|---|---|
| 4,777,944 A | 10/1988 | Green et al. |
| 4,848,871 A | 7/1989 | Seidel et al. |
| 4,972,177 A | 11/1990 | Nolan |
| 5,224,496 A | 7/1993 | Palmer et al. |
| 5,263,497 A | 11/1993 | Grabenkort et al. |
| 5,353,793 A | 10/1994 | Bornn |
| D361,462 S | 8/1995 | Newham |
| 5,554,835 A | 9/1996 | Newham |
| 5,600,108 A | 2/1997 | Newham |
| 5,623,760 A | 4/1997 | Newham |
| 5,633,627 A | 5/1997 | Newham |
| 5,640,145 A | 6/1997 | Newham |
| 5,654,694 A | 8/1997 | Newham |
| 5,945,914 A | 8/1999 | Holmes et al. |
| 5,969,342 A * | 10/1999 | Feng et al. ............ 250/227.14 |
| 6,065,727 A | 5/2000 | Fitzgerald et al. |
| 6,111,509 A | 8/2000 | Holmes |
| 6,292,102 B1 | 9/2001 | Smith |
| 6,307,476 B1 | 10/2001 | Smith et al. |
| 6,417,777 B1 | 7/2002 | Fitzgerald et al. |
| 6,441,742 B1 | 8/2002 | Lovely et al. |
| 6,544,200 B1 | 4/2003 | Smith et al. |
| 6,696,653 B1 | 2/2004 | Smith et al. |
| 6,784,797 B1 | 8/2004 | Holmes |
| 6,858,811 B1 | 2/2005 | Fitzgerald et al. |
| 6,864,795 B1 | 3/2005 | Smith et al. |

FOREIGN PATENT DOCUMENTS

| | | |
|---|---|---|
| GB | 2283567 A | 5/1995 |

* cited by examiner

Figure 13A
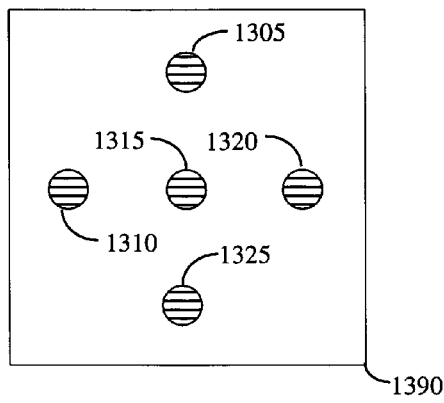
Figure 13B
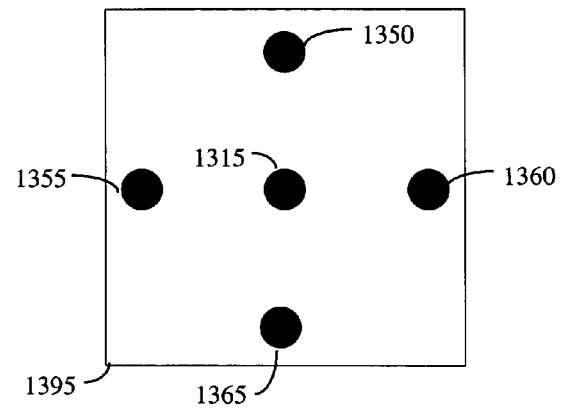
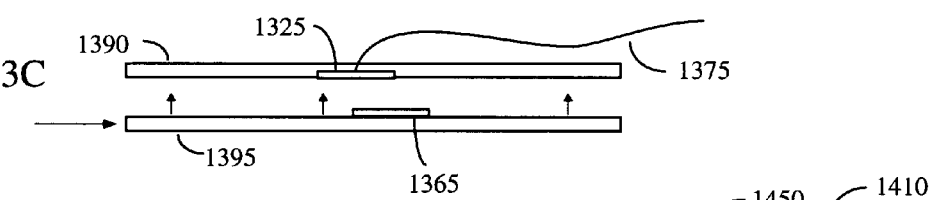
Figure 13C
Figure 14A
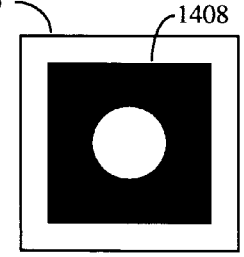
Figure 14B
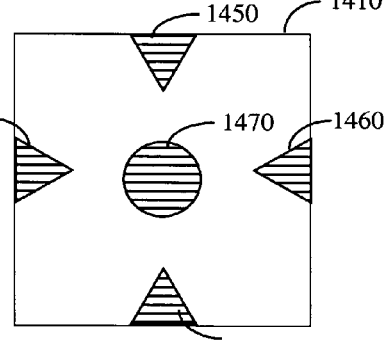
Figure 14C
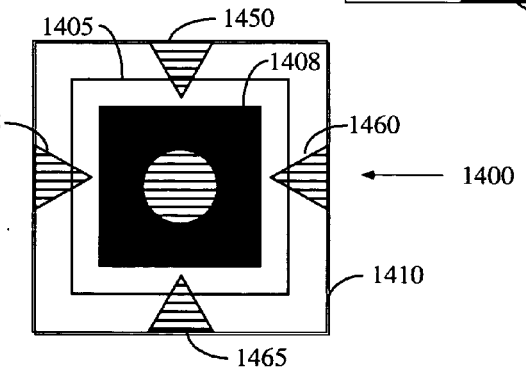

DISPLACEMENT SENSOR APPARATUS

RELATED CASES

This application claims priority to U.S. provisional patent application No. 60/512,042, which was filed on Oct. 17, 2003 (now U.S. patent application Ser. No. 10/966,986) and to U.S. provisional application No. 60/524,978 filed on Nov. 25, 2003, the disclosures of both of which are incorporated by reference herein as if fully set out at this point.

This invention relates generally to sensors for measuring the relative displacement between two surfaces or within a single surface under shear stress and, more particularly, to sensors that employ electrical or optical means to measure relative displacement.

BACKGROUND OF THE INVENTION

One of the world's most venerable technical problems is that of measuring displacement. Depending on the scale of the problem, any number of solutions have been proposed. With respect to large-scale measurements, rulers, tape measures and, more accurately, laser or other optical means have been used. For measurements of displacement that occur on a much smaller scale, optical interferometry or some other highly sensitive measurement method is often used.

Although there are many uses to which a measure of displacement might be applied, one that is of interest for purposes of the instant application is that of measuring the displacement that results from the application of force to a solid. That is, as is well known to those of ordinary skill in the art, strain results from the application of force to the external surface of a solid body. It is fundamental that given the force applied to the body and a measure of the amount of deformation, it is possible to calculate various physical parameters of the body including its shear modulus, Young's modulus, Poisson's ratio, etc.

However, many methods of calculating displacement under stress require expensive equipment and are not suitable for use in the field. Further, many of these measurement techniques are only applicable to measurement of a single axis of movement (e.g., longitudinally) and, thus, require multiple sensors to measure anything other than displacement along a single axis.

Optical methods are often preferred when making displacement measurements. Traditionally, methods of optical measurement of displacement fall into one of three categories: sensors that utilize interferometer techniques, sensors the employ optical gratings, and sensors that are based on the use of optical resonant cavities. As compared with electrical methods, optical methods do not require electrical wiring in order to transmit signals and, thus, they are not affected by electromagnetic interference which can cause measurement errors in electronic measurement methods. Further, electrical methods typically utilize a two element conductor to transmit signals and this conductor tends to be heavier than a corresponding capacity fiber optic line. This, of course, can pose a problem when the measuring device needs to move freely. As compared with mechanical measurement techniques, optical methods are preferred because of the increased accuracy that is possible. Further, optical methods are imminently suited for use in conjunction with a computer, whereas mechanical methods require some sort of translation/reformatting to make them into computer readable form. Finally, generally speaking optical methods do not traditionally require that contact be made between the sensor elements on the moving and stationary surfaces which can be an advantage in some settings.

However, optical measurement methods are not without their faults. This technology can require the use of large optical components such as beam-splitters, mirrors, lenses, etc., which can make application of this technology difficult outside of a laboratory.

Thus, what is needed an improved optical method and apparatus of measuring displacement which is not unduly complex and which does not require an inordinate amount of support equipment. Preferably, this apparatus will be suited for use in measuring strain/shear in solids.

Heretofore, as is well known in the measurement arts, there has been a need for an invention to address and solve the above-described problems. Accordingly, it should now be recognized, as was recognized by the present inventors, that there exists, and has existed for some time, a very real need for such a system.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a first preferred embodiment of the instant invention, there is provided a sensor for determining relative displacement which utilizes two optically conductive surfaces in proximity to each other, whereby the amount of displacement between the two surfaces may be determined by measurement of the magnitude of the intensity of light transmitted through the apparatus. In brief, the instant invention consists of a light emitting member and a light receiving member proximate thereto, wherein at least a portion of the light that leaves the emitting member is absorbed by the receiving member and wherein the amount of light that is transmitted between the two members is a function of their relative displacement.

Preferably, light from one or more light sources is transmitted, e.g. via a fiber optic line, to the emitting member. In the preferred embodiment this will be a rectangular optically conductive element. The receiving member is positioned proximate to the emitting member and is preferably identically dimensioned. The receiving member has an optically conductive conduit (e.g., fiber optic line) affixed thereto for purposes of receiving light which is collected by the receiving member. When the emitting and receiving members are exactly aligned with each other, light will be maximally transmitted between them. However, when the emitting and receiving members are offset from each other, the amount of light captured by the receiving member will be lessened. Thus, by using a photoelectrical cell or similar device (e.g., a photodiode, a photo transistor, or a photo receptor, etc.) to monitor the intensity level of light that is captured by the receiving member, the amount of overlap between the two members and, hence, the amount of relative displacement between the two, may be quantitatively determined. It should be noted that in one preferred embodiment, this single sensor is capable of sensing displacement in any horizontal direction, where horizontal is measured with respect to the orientation of the emitting and receiving member faces.

According to another preferred embodiment, there is provided a displacement sensor substantially similar to that described above but which is suitable to measuring and quantifying displacement in any horizontal (i.e., 2-D) direction. In one preferred embodiment, a plurality of different colored lights (e.g., LEDs) will be arrayed in a grid to form a light source. The multi-color light source will then be transmitted through an optically transmissive element such as fiber optic cable to the emitting and receiving members described previously. On the receiver end, a plurality of photosensitive elements will be provided, each photosensitive element corresponding to one of the colors in the light array. Then, to the extent that one or more of the colored lights sources is obscured or its light intensity reduced in amplitude, such a change can be related to the movement direction of the sensor and, hence, displacement.

In another preferred embodiment, there is provided a displacement sensor substantially as described above wherein the emitting member has a plurality of different colored transparent regions on its receiving face. The purpose of each colored region is to restrict the frequencies of light passing therethrough to a relatively narrow band. Preferably, the light source will be white or broadband light. Then, light will be transmitted from the source through the emitting element and into the receiving element, at which time it will be filtered according to the chosen color scheme that has been imposed on its face. A photosensitive device will be placed in optical communication with the receiver that includes photoactive elements that are responsive to each of the transmitted colors. When the emitter and receiver are not in complete alignment it will be possible to determine the amount of displacement between the two elements by measuring the intensities of the transmitted colors of light.

In still another preferred embodiment, there is provided a displacement sensor that utilizes a plurality of spaced apart resistors or resistive elements to measure relative movement between two surfaces and/or expansion/contraction of a single surface. Preferably, as displacement occurs, a contact element will successively engage different ones of the resistive elements so that by measuring the resistance (or capacitance, etc.) within the circuit it will be possible to quantitatively determine the amount of displacement.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Further, the disclosure that follows is intended to apply to all alternatives, modifications and equivalents as may be included within the spirit and scope of the invention as defined by the appended claims. Finally, it should be understood that the phraseology and terminology employed herein are for the purpose of description and should not be regarded as limiting, unless the specification specifically so limits the invention.

While the instant invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

BRIEF DESCRIPTION OF THE DRAWINGS

Other objects and advantages of the invention will become apparent upon reading the following detailed description and upon reference to the drawings in which:

FIG. 13 illustrates another preferred embodiment, wherein a multiplicity of separate optical pickups are used to determine relative displacement.

FIG. 14 contains an illustration of still another preferred embodiment wherein separate optical pickups are used to determine relative displacement.

DETAILED DESCRIPTION OF THE INVENTION

OPTICAL EMBODIMENTS

Figure 1:
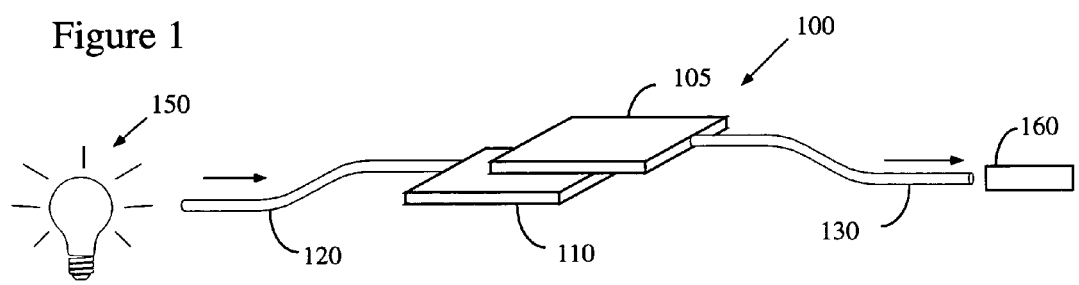
FIG. 1 illustrates a preferred embodiment of the instant invention.

According to a first preferred embodiment of the instant invention and as is generally set out in FIG. 1, there is provided a sensor 100 for determining relative displacement which utilizes two optically conductive members (upper/receiving member 105 and lower/emitting member 110) that have been placed into proximity with each other in an approximately parallel configuration. Broadly speaking, this invention operates to sense a displacement between these two elements by determining the intensity (magnitude, etc.) of light from source 150 that is transmitted through the sensor 100 and is received by a light sensitive photoreceptor element 160. The amount of light received by the photoreceptor element 160 will be at a maximum when the upper 105 and lower 110 members are in perfect alignment and less so when one element is displaced relative to the other. Thus the intensity of the transmitted light as preferably measured by the receptor 160 can be used to calculate the amount of offset between the upper 105 and lower 110 members and, hence, the amount of relative displacement.

Figure 4A:
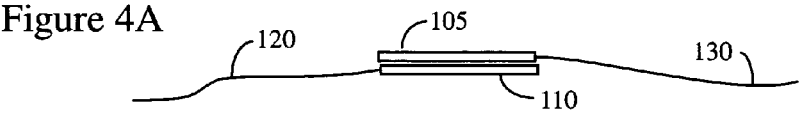
FIG. 4 is a schematic illustration of how the emitter/receiver portions of the instant invention operate to signal their relative positions to an attached photo electric element.
Figure 4B:
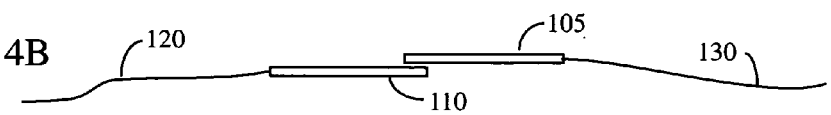

FIG. 4 illustrates this concept in greater detail. In FIG. 4A, the upper 105 and lower 110 members are in complete alignment. Light that is transmitted via optical line 120 into lower/emitting member 110 will be radiated to the maximum extent possible into upper/receiving member 105 and, thereafter, via line 130 to a photoreceptor element 160. Contrast this arrangement with that illustrated in FIG. 4B, where there is very little overlap between the upper 105 and lower 110 members. In this scenario, light that is radiated from lower member 110 will largely miss the receptor/upper member 105, thus reducing the amount of light that is captured and subsequently transmitted via optical line 130. Methods for determining the amount of displacement given the measured light intensities at a photoreceptor element 160 will be discussed below.

Figure 3:
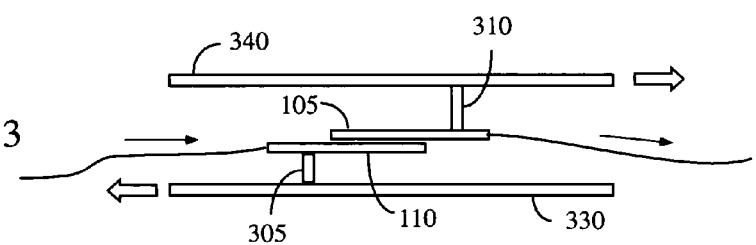
FIG. 3 contains an illustration of a preferred method of measuring displacement between two different surfaces.

FIG. 3 illustrates how the instant invention can readily be adapted to measure the amount of displacement caused by movement of two adjacent surfaces. In this preferred embodiment, support post 305 is affixed to surface 330 and support post 310 to surface 340. Relative movement of the support surfaces will result in upper member 105 uncovering some or all of lower member 110, which, in turn, results in a corresponding reduction in the amount of light captured by the upper member 105.

Figure 2:
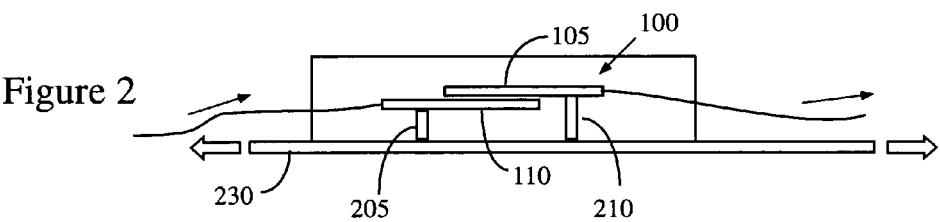
FIG. 2 illustrates how the instant invention may be used to measure strain in a solid body.

FIG. 2 illustrates another preferred embodiment, wherein the instant invention 100 is used to measure the strain/elasticity on a single support surface 230. For example, if the support surface 230 is at least somewhat elastic, putting tension (or compression) on opposite ends of this surface 230 will tend to change the spacing between support posts 205 and 210 as the surface stretches (or compresses). Such a change will be reflected in the amount of overlap between the two optically conductive members 105/110 and, hence, the amount of light transmitted therethrough. By calculating the decrease in the amplitude of the light transmitted and comparing that with the maximum possible light intensity (as determined, e.g., empirically based on the maximum transmission configuration) it is readily possible to determine how much the two members 105 and 110 have moved with respect to each other in absolute terms.

The members 105/110 will preferably be made of a light transmitting or optically transparent/translucent material such as polycarbonate. As a consequence, when light is piped into member 105, the light will propagate through it and tend to be emitted in large part from its top and bottom surfaces. In some preferred embodiments, the lower surface of interface member 105 which faces away from member 110 may be silvered or otherwise mirrored to increase the amount of light that is traveling toward member 110. Light that is radiating from emitting member 105 will travel toward the matching face of receiving member 110, where it will be channeled to line conduit 130 and, ultimately, to photo receiver 160.

Note that one feature of the invention as described previously is that it is responsive to displacement in any horizontal direction, assuming that the unit 100 is mounted horizontally, of course. More precisely, a decrease in the transmitted light amplitude will be noted if the elements 105/110 are moved relative to each other while maintaining a constant distance between the two elements. However, if the elements 105/110 are constrained so that only movement along a single axis (e.g., left-and-right in FIG. 3) is permitted, the variation in received light intensity through the unit is directly correlated to the amount of relative movement between the two interface members (members 105 and 110) and a simple calculation will yield an estimate of the relative amount of displacement. Thus, assuming that light is at least approximately uniformly distributed across the face of emitter 105, if the length of the emitter/receiver is multiplied by the ratio of the measured light intensity to the maximum possible light intensity, an estimate of the amount of displacement will be obtained.

On the other hand, if the two interface members 105 and 110 are allowed to move in any arbitrary horizontal direction the computation of the amount of displacement becomes problematic using the simple approach described previously unless additional steps are taking as is described below. That being said, even without customizing the sensor 100, the raw computation of the amount of displacement still gives useful information about the gross amount of movement.

As a specific example of how displacement might be calculated using the instant embodiment, it will be assumed for the moment that the sensor members are constrained to move along one axis (e.g., longitudinally). In that instance, let $I_o$ be the amount of light sensed by photoreceptor 160 when the upper 105 and lower 110 members are in exact alignment (e.g., FIG. 4A) and the light source 150 is activated. Supposing, for purposes of illustration, that each of the members 105/110 are squares one inch on a side. Finally, assuming that, after displacement, the reading on photo receptor 160 is $I_D = I_o/2$, the actual amount of displacement would be calculated to be:

$$D = (1 \text{ inch}) * \left(\frac{I_D}{I_O}\right) = (1 \text{ inch}) * \left(\frac{I_o/2}{I_O}\right) = 0.5 \text{ inch}$$

Clearly, this calculation will only yield reliable estimates of displacement if the members 105/110 are constrained so that movement is allowed only in a single direction. It should be noted that the inventors have utilized a one-inch sensor in the previous calculations only for purposes of simplifying mathematics and that the use of sensors that are much larger or much smaller (depending, for example, on the magnitude of the displacement that is being measured) have been specifically contemplated by the instant inventors. Those of ordinary skill in the art will readily be able to select a sensor size that is appropriate for any particular application.

Figure 5:
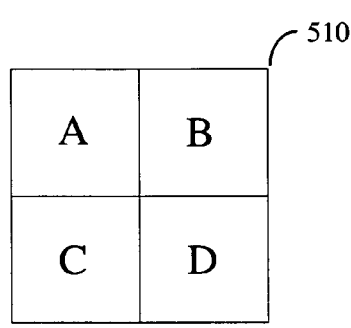
FIG. 5 illustrates a preferred embodiment of the instant invention which utilizes multiple/different colored regions on the face of the emitter to increase the precision of the estimated displacement.

If it is desired to obtain measurements of offsets in any arbitrary two-dimensional direction, a modified version of the previous embodiment is preferred. As is generally illustrated in FIG. 5, according to another preferred embodiment there is provided an optical sensor for determining displacement, wherein a pattern of different colored regions have been added to the face of once of the sensor members 105/110. Preferably regions A, B, C, and D of optical member 510 are each designed to pass a limited frequency range of light and could be, for example, gel-type filters, colored transparent glass, plastic, etc. Of course, those of ordinary skill in the art will recognize that it is not essential that the colors regions be added on top of an existing clear sensor member 105, but could instead be made to be integral to the sensor member 105 during the manufacturing process or, alternatively, could be implemented in the form of four discrete filters in an assembly. In terms of color choices, as an example only, region A might be colored orange, region B might be colored yellow, region C might be colored blue, and region D might be colored indigo. The only requirement for this particular embodiment is that the colors that are applied to each region be differentiable by, for example, an individual photoreceptor. Alternatively, the photoreceptor can be sensitive to the specific light wavelength listed above with ABCD manufactured from clear lenses.

The intent of the application of various colors to member 510 is to restrict the frequencies of light passing through that portion of the sensor. When the light frequencies are so restricted, it is possible to determine via photoreceptor 160 the light intensity received in each of the passed wavelengths. Then, by comparing the received light intensity at each frequency with the known intensity when the upper and lower members are perfectly aligned, the amount of displacement may be calculated.

Figure 6:
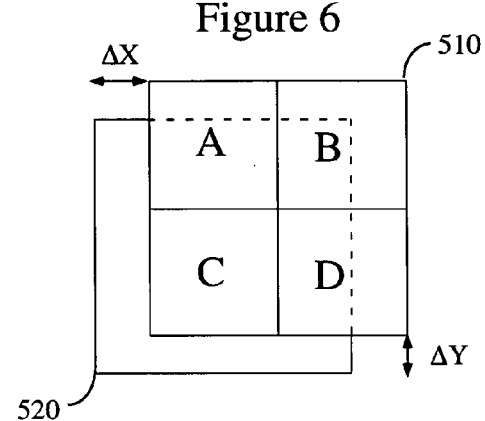
FIG. 6 contains a diagram which generally illustrates how the embodiment of FIG. 5 would respond to a relatively modest displacement.

The following simple calculations illustrate one method of determining the amount of offset given the intensities of light passing through the four regions of FIG. 5. Consider the scenario of FIG. 6. Here, the sensor consists of lower member 520 and upper member 510. For purposes of illustration only, it will be assumed that the upper member 510 has moved upward and to the right with respect to the lower member 520. Let $I_{A0}$, $I_{B0}$, $I_{C0}$, and $I_{D0}$ be the fully-aligned light intensities received through the two sensors (i.e., the reference values) and let $I_A$, $I_B$, $I_C$, and $I_D$ be as-measured light intensities after the upper member 520 has been offset by $\Delta X$ in the horizontal direction and $\Delta Y$ in the vertical direction, with $\Delta X$ and $\Delta Y$ being less than L/2, where each region A–D is identically sized and the members 510/520 are square with each side of dimension L. In such a scenario, from simple geometric arguments it follows that the received light intensities will be proportional or approximately equal to:

$$I_A = \frac{(L/2 - \Delta Y) * (L/2)}{(L/2)^2} I_{A0}$$

$$I_B = \frac{(L/2 - \Delta Y) * (L/2 - \Delta X)}{(L/2)^2} I_{B0}$$

$$I_C = I_{C0}$$

$$I_D = \frac{(L/2 - \Delta X) * (L/2)}{(L/2)^2} I_{D0},$$

where the only unknown quantities are $\Delta X$ and $\Delta Y$. Note that there will be a slightly different (but comparable) set of equations which apply when the upper member 510 is moved toward each of the three other quadrants. Those of ordinary skill in the art will be readily able to derive such alternative equations. Note further that in this example $I_C$ should be equal to its reference intensity $I_{C0}$, which provides an easy way to determine, generally, which direction the upper member 510 has moved: the quadrant (or quadrants as discussed below) whose light intensity is unchanged from its reference value will be opposite to the direction of movement.

Clearly, the equations for $I_A$ and $I_D$ presented above can be directly solved for $\Delta X$ and $\Delta Y$ to yield:

$$\Delta Y = L/2 \left(1 - \frac{I_A}{I_{A0}}\right)$$

$$\Delta X = L/2 \left(1 - \frac{I_D}{I_{D0}}\right)$$

Thus, given the reduction in light intensities in each of the four quadrants, the actual amount of offset may readily be calculated according to the previous equations, given the dimensions of the measuring device 100. Note that by substituting $\Delta X$ and $\Delta Y$ back into the equation for $I_B$ a check may be performed on the overall quality of the calculations.

Figure 7:
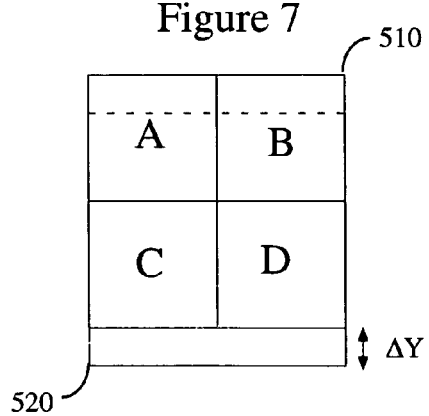
FIG. 7 illustrates how the embodiment of FIG. 5 can be used to determine displacement along a single axis.

It is certainly possible that in some cases the two members 510 and 520 might be moved along a single coordinate axis, for example vertically, with respect to each other as is illustrated in FIG. 7 (i.e., $\Delta X=0$). In that case, the rules and equations discussed above will still apply, except that $I_D$ will also be equal to its reference value $I_{D0}$. Thus, the previous equations could be used without change and should yield for this scenario and within measurement error, a value of $\Delta X$ equal to zero.

Figure 8:
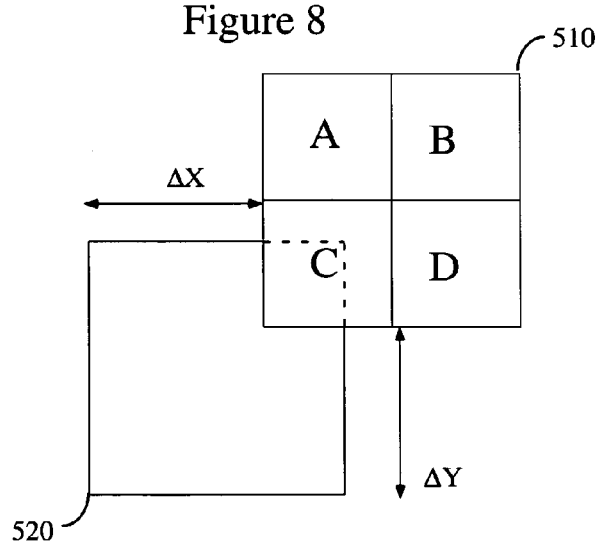
FIG. 8 contains a diagram which generally illustrates how the embodiment of FIG. 5 would respond to a relatively major displacement.

It should be noted that the equations offered above are, strictly speaking, only valid if $\Delta X$ and $\Delta Y$ are less than L/2. However, it still may be possible to estimate the amount of offset if that inequality is exceeded (e.g., FIG. 8). For example, in the event that the amount of displacement is being continuously monitored, it might be possible to establish a trajectory for the movement of the upper member 510 with respect to the lower member 520 and, using that trajectory together with the one or two remaining intensities that can still be measured, calculate an approximate amount of offset. Those of ordinary skill in the art will recognize readily how this might be done.

Another possible solution that might be considered if the $\Delta X$ and $\Delta Y$ are expected to be greater than L/2 is to increase the dimensions of the members 510/520, i.e., increase L. Still another possible solution would be to further subdivide the color member 510 into 9, 16, (e.g., if the members 510/520 are square) or any other arbitrary number of different color panels. This would provide higher resolution if the use required such increased resolution.

Figure 9:
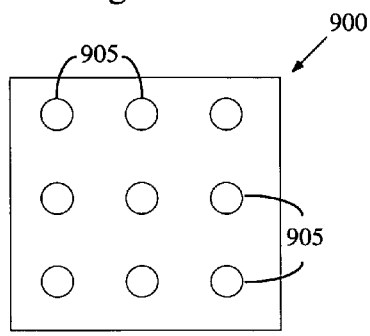
FIG. 9 illustrates another preferred embodiment, wherein a bank of different colored light sources is utilized as an illumination source.
Figure 10:
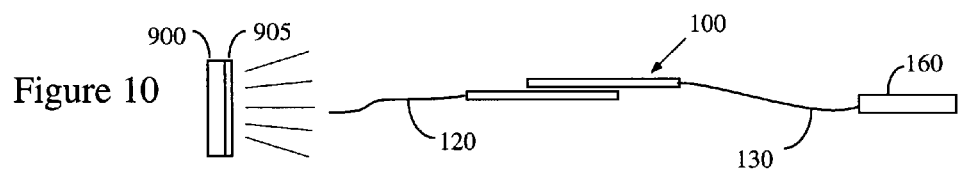
FIG. 10 contains a preferred arrangement of the invention of FIG. 9.

In another preferred arrangement, a bank of multi-colored lights (e.g., LEDs) will act as the illumination source, with displacement being determined by reductions in intensity of one or more of the light sources. As is generally indicated in FIG. 9, the preferred illumination source 900 for this embodiment is an array of individual lights 905, wherein each of the lights 905 radiates light at a different color/frequency. LEDs would be preferable for use as the illumination sources 905. Of course, those of ordinary skill in the art will recognize that a prism which is used in combination with a white light source could also be used to create a multiplicity of colored light sources, each confined to a particular region of the emitting surface 110. A preferred arrangement optionally includes diffuser 905 (FIG. 10) which is designed to spread the light which emanates from the LEDs 905 more evenly so that the image of such lights will not appear as point sources on the face of the emitter 110.

As was described in connection with the previous embodiment, by choosing each of the light sources 905 to be a different light frequency, it is possible to determine at the photo receiver 160 which light(s) has been occluded by the displacement between the upper and lower members 105/110. Those of ordinary skill in the art will readily be able to devise many ways of making this determination. That being said, and by way of example, it should be clear that each time one of the light sources 905 disappears from the receiver's 160 view, that means the image of the corresponding light source—as it appears on member 110—has been "shifted" from view. Thus, in simplest terms the array of lights 905 forms a kind of coordinate system that yields at least approximate displacement values based on the presence/absence of a light frequency from the photo receptor 160.

More generally, a computation analogous to that suggested above may be performed with respect to the light array 900. More particularly, and turning now to FIGS. 11 and 12, it is well known that light sources 905 will tend to illuminate circular regions of lower member 110. Note that the example of FIG. 11 has been drawn to show gaps in the coverage of the illuminated portion of lower member 110 to make clearer the discussion that follows. In practice, there would preferably be no such gaps and the regions illuminated by the light sources 905 would overlap to the extent that they completely cover the face of lower unit 110.

In practice, the logic utilized previously can be used again in this scenario to determine the relative offset between the two members 105 and 110. Available to be used in the solution will be $I_E$ through $I_M$, the measured intensities of each of the regions E–M, as well as $I_{E0}$ through $I_{M0}$, the light intensities at the corresponding frequencies when the two members 105 and 110 are in perfect alignment. Preferably the method that is utilized will first determine which of the regions E–M are completely obscured or completely visible. Knowledge of that information will provide guidance in a general way as to the direction and magnitude of the displacement.

Then, given the previous information, those regions E–M that are partially obscured will be used to determine the actual amount of displacement ΔX and ΔY preferably by forming equations that express the amount of area each light source that is occluded as a function of the displacement. The formation and solution (which may require a numerical solution) of such equations is well within the ability of one of ordinary skill in the art and will not be discussed here. Note, however, that the intensities of the light that appears in regions F and G can each be used to provide independent estimates of ΔY and light in regions H and K can be used to provide independent estimates of ΔX.

Figure 11:
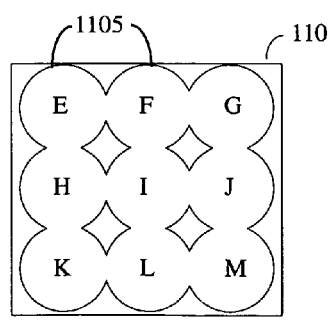
FIG. 11 illustrates how the light sources of FIG. 9 might appear on the face of the emitting element.
Figure 12:
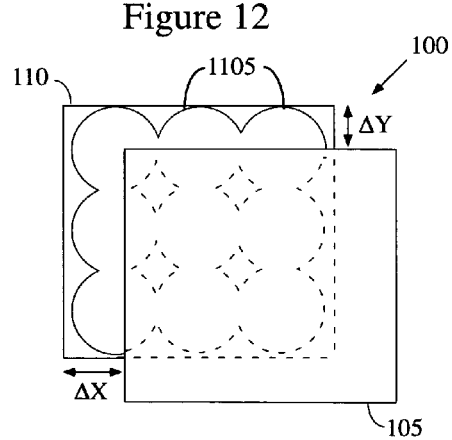
FIG. 12 illustrates how the arrangement of FIG. 11 can be used to determine the relative offset between the emitting and receiving members.

Note that the foregoing computations assume that, as pictured in FIG. 11, the light sources appear on lower member 110 in approximately circular patterns. Clearly, the instant method could be adapted to work with light images of any arbitrary shape. It is also preferably assumed that the light energy is uniformly distributed throughout each circle E–M. That being said, those of ordinary skill in the art will understand how the previous analysis could readily be modified by alternative assumptions, including the assumption that the intensity of the light source decreases as a function of the distance from the center of each of the regions E–F.

According to another preferred arrangement, there is provided an optical device for measuring displacement wherein a plurality of optical pickups are utilized. As is indicated in FIGS. 13A and 13C, optical pickups 1305–1325 will preferably be affixed to the face the receiving member 1390 that is opposite the emitting member 1395. That being said, those of ordinary skill in the art will understand that, depending on the transparency of the receiving member 1390 the optical pickups 1305–1325 could readily be mounted on the face opposite that of emitting member. The purpose of the optical pickups 1305–1325 is to collect at least a portion of the light that falls on the receiving member and transmit that energy further to a corresponding number of photosensitive/photoreceptive elements. Note that the shape of the optical collectors 1305–1325 is immaterial to the operation of the instant invention, except that some shapes lend themselves more readily to calculation of the offset than others.

Emitting member 1395 accepts light input (e.g., as indicated FIG. 13C) and then radiates at least a portion of that energy toward the receiving member 1390. In this embodiment, a plurality of optically opaque blocking members (1350–1365) have been placed on the face of the emitting member 1395 that radiates light toward the receiving member 1390. Although there are many ways of doing this, one preferred method involves printing black regions directly on the emitting surface of member 1395. that being said, there are certainly many other ways this could be implemented.

FIG. 13B provides a plan view of the instant sensor with both the receiving member 1390 and the emitting member 1395 (hidden from view in this figure) in place. Shown in phantom are the blocking members 1350–1365 which preferably are placed in proximity with the optical collectors 1305–1325. Note that, in this embodiment, the blocking member that is associated with optical collector 1315 cannot be seen because it is positioned directly below it in this view. Note further that, for purposes of clarity, the optical lines associated with each individual optical collector 1305–1325 have not been shown in FIGS. 13A and 13B.

In practice the embodiment of FIG. 13 would be utilized as follows. Each optical collector will have an optical line associated with it (e.g., line 1375 in FIG. 13C) and, in optical communication with the optical lines will preferably be a same number of photosensitive elements. Thus, displacement of member 1390 with respect to member 1395 will result in variations in the intensity of light collected by each of the photosensitive elements. For example, if in FIG. 13B, element 1390 were to move toward the north east (upper right corner) while element 1395 remained stationary, the light intensity associated with optical collector 1395 would tend to increase as it moved from directly above its blocking member; the light intensity associated with optical collector 1305 would tend to decrease as it covered more of blocking member 1350; the light intensity associated with optical collector 1325 would tend to increase as it will be blocked to a lesser extent by blocking member 1365, etc.

Given the pattern of increases and decreases in light intensity and a knowledge of undisplaced light intensity to each collector, an estimate of the relative amount of displacement may be obtained according to methods well known to those of ordinary skill in the art. As has been explained previously, the precise equations which yield the offset in terms changing intensities will depend on the geometric shapes of the collecting and blocking members.

But, an analysis similar to that presented previously will yield the sought-after equations.

Turning now to FIG. 14, there is provided an embodiment substantially similar to that discussed previously, except that different geometric shapes are utilized for the optical collectors and the emitting/masking members. As is indicated in FIG. 14A, in a preferred embodiment the emitting member 1405 will be optically masked with a single blocking element 1408 which has been selected to be positioned to block light that is radiating toward receiving member 1410 and takes the shape of a square with a circular hole in the middle. In FIG. 14B, Optical collectors 1450–1465 are positioned around the periphery of the receiving member 1410 and a circular collector 1470 is preferably positioned in the center of that element. Finally, FIG. 14C illustrates a plan view of the combined sensor 1400, wherein the receiving member 1410 has been placed under the emitting member 1405. As can be seen, any horizontal displacement of one member 1405/1410 with respect to each other will result in a corresponding decrease (or increase) in the amount of light impinging on the optical collectors, depending on how the optical masking 1408 moves to covers or uncover the various optical collectors. Member 1470 will provide an absolute value for the displacement and evaluation of the light intensity within optical collectors 1450–1465 will give directional information.

Turning next to a discussion of photo receptor element 160, in a preferred arrangement a photoelectric cell or similar hardware that reacts to the presence and intensity of light is used. As is well known to those of ordinary skill in the art, a photoelectric cell or photocell is a device whose electrical characteristics (e.g., current, voltage, or resistance) vary when light is incident upon it. Further, it is well known in the optical communication industry that such elements are available wherein they respond only to light in a relatively narrow wavelength frequency band and those skilled in the art will be readily able to select such sensors that would be suitable for use with the instant invention.

Figure 18:
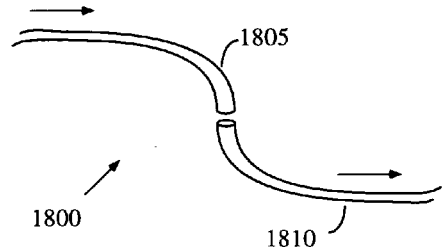
FIG. 18 contains an illustration of a preferred embodiment which utilizes two fiber optic cables placed end-to-end such that the intensity of the light which is transmitted therethrough is a measure of relative displacement.

Finally, and as is generally illustrated in FIG. 18, there is provided a displacement sensor 1800 which would likely be best suited for measuring relatively small amounts of displacement. In a preferred arrangement, the open end of an source optical fiber 1805 is placed in optical communication with (e.g., butted directly against) the open end of receiver optical fiber 1810. One of both of these optical fibers will be free to move with respect to the other. To the extent that the termini of the two ends are directly aligned, a maximum amount of light will be transmitted. However, even very small amounts of displacement (depending on the diameter of the optical lines) will reduce the amount of light that is transmitted between them. Thus, be measuring the intensity of light conveyed through receiver optical fiber 1810 and comparing that amount with a known maximum possible light intensity, an estimate can be made of the amount of overlap between the two termini and, hence, the amount of relative displacement that has occurred.

ELECTRICAL EMBODIMENTS

Figure 15:
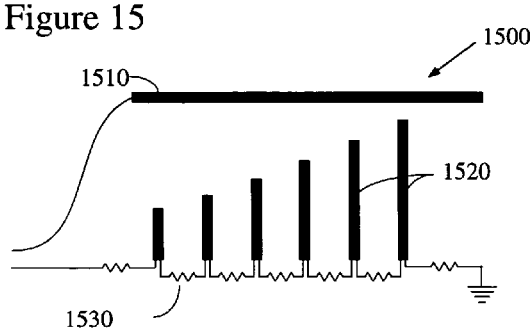
FIG. 15 illustrates a preferred displacement sensor embodiment wherein a bank of contacts elements successively engage as a contact bar is displaced.

According to another preferred embodiment, there is provided a displacement sensor that does not utilize optical means but, instead, utilizes electrical means to determine and quantify an amount of movement. As is generally indicated in FIG. 15, according to a this preferred embodiment there is provided an electrical circuit 1500 which includes a movable contact bar 1510 which is used in combination with spaced apart extensions 1520 to determine an amount of displacement, the contact bar 1510 and the extensions 1520 being configured to be movable with respect to each other. Then, as the contact member 1500 moves downward (with respect to the extensions 1520 in the illustration), it will successively encounter additional ones of the extensions 1520, each of which preferably is associated with one or more resistors 1530 as is pictured in FIG. 15. Engaging an extension 1520 preferable adds an additional resistor 1530 to the circuit. Thus, by monitoring the resistance (or, alternatively, any other similar electrical property) of this circuit it will be possible to determine the number of extensions 1520 that have been contacted and, thus, at least the approximate location of the contact bar 1510 and, hence, the amount of displacement experienced by the elements of this circuit 1500.

According to another electrical embodiment, there is provided a sensor substantially as described above, but wherein a plurality of circuits similar to circuit 1500 are arranged together in such a manner as to provide increased precision in measurement as compared with the embodiment of FIG. 15. In more particular, the instant embodiment features a plurality of contact bars 1710, 1712, and 1714, each of which is placed proximate to an electrically isolated bank of extensions. In the preferred embodiment, each of the contact bars 1710–1714 moves in tandem with the others. Further, in one preferred arrangement the lengths of the extensions are selected so as to provide greater precision in the measurement of displacement. That is, and by way of example only, the contact bar 1710 of switch 1780 in concert with its extensions provides a first rough measure of the amount of displacement. That rough estimate is refined by switches 1785 and 1790, depending on the position of the contact bar 1710. For example, the lengths of the extensions of switch 1785 subdivide the length of the between extensions 1720 and 1725 so that when contact bar 1710 has made contact with extension 1720 but is not far enough advanced to be in contact with extension 1725, the contact bar 1712 will engage one or more of the intermediate length extensions, thereby providing increased measurement resolution. Similarly in switch 1790, its extensions are sized so as to subdivide the difference in length between extensions 1725 and 1728. Contact bar 1714 thus provides additional resolution when bar 1710 is located between extensions 1725 and 1728.

Figure 16A:
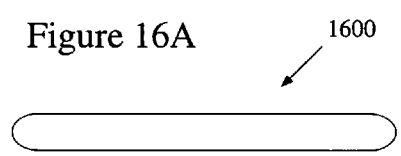
FIG. 16 contains a preferred embodiment, wherein the changing electrical properties of an elastically deforming member is used to determine an amount of displacement.
Figure 16B:
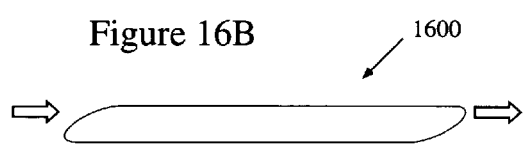
Figure 17:
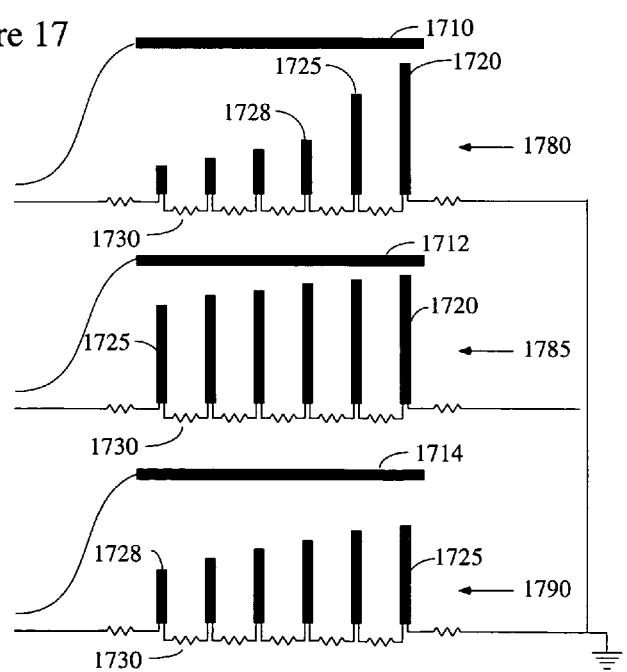
FIG. 17 illustrates a preferred embodiment where multiple ones of the displacement sensors of FIG. 16 are combined to yield a more accurate estimate of the relative displacement preferably between two bodies.

Finally, and turning now to FIG. 16, there is provided an apparatus for measuring displacement 1600, which utilizes electrical properties that change with the stress that is placed thereon. FIG. 16A illustrates how one preferred embodiment of the instant device 1600 would appear in an unstressed condition. In a preferred arrangement, the upper surface of device 1600 will be affixed (e.g., via adhesion) to one surface and the lower face of the device 1600 to another surface, such that any displacement between the two surfaces will be create stress within the instant device 1600. Relative displacement between the two surfaces connected by the instant device 1600 will result in deformation of the sort generally depicted in FIG. 16B. In the event such distortion is experienced, in many materials the electrical properties will correspondingly change. Thus, by positioning electrodes, say, on the upper and lower surface and measuring some electrical property (e.g., resistance, capacitance, etc.) of the instant device 1600, it is possible to empirically determine how such a property varies with stress and, hence, displacement. Materials that would be suitable for use in constructing the instant device include, without limitation, PET (i.e., polyethylene). Additionally, the top surface (or, even just the "noses" on the ends of the device)

could be made of a material such as piezoelectric film such that displacement (and concomitant shear/rotation of the device 1600) would generate a voltage that is roughly proportional to the amount of displacement.

CONCLUSIONS

It should be noted that the instant invention is capable of many variations beyond those specifically disclosed herein. For example, although the preferred embodiments have utilized generally square or rectangular members as sensors, that is clearly not required. With some modification the instant method could work with sensors of any shape including, without limitation, triangular, circular, etc.

It should be further be noted that, although the preferred embodiment utilizes to parallel plates as the core of sensor 100, that is not strictly required. What is important is that the surfaces of the two sensor plates are preferably at least approximately parallel with each other so as to maximize the exchange of light energy therebetween. Thus, it would be within the scope of the instant invention to use, for example, two curved sensor members if a measure of rotational displacement were sought.

Those of ordinary skill in the art will recognize that it is expected and preferred that the instant sensor 100 be shielded from ambient light while it is in use to increase its accuracy. That might mean, for example, that it was positioned within a light-tight enclosure.

Additionally, it should be noted that although the instant invention is well suited to measure tension and shear in a solid, it has uses far beyond that application area including, without limitation, the measurement of displacement between any two surfaces, the measurement of radial displacement, etc.

Finally, those of ordinary skill in the art will recognize that the calculations and equations presented herein are offered by way of example only and that, in practice, it might be necessary to calibrate the optical displacement switch empirically. That is, the equations provided above are founded on the assumption that light has been uniformly distributed across the face of the emitting member. However, if that is not the case it would be well within the ability of one of ordinary skill in the art to devise an empirical means of calibrating any of the sensors disclosed herein.

Thus, it is apparent that there has been provided, in accordance with the invention, a patient sensor and method of operation of the sensor that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. An optical displacement sensor, comprising:
   (a) a first optical line, said first optical line being positionable to be in optical communication with an illumination source;
   (b) a sensor emitter, said sensor emitter having at least one emitting surface,
      (b1) wherein said sensor emitter is in optical communication with said first optical line,
      (b2) wherein said sensor emitter is non-diffracting and optically conductive, and
      (b3) wherein at least a portion of any light originating from said illumination source is emitted from said at least one emitting surfaces;
   (c) a sensor receiver, said sensor receiver having at least one receiving surface, said sensor receiver being positioned to be proximate to said sensor emitter and in optical communication therewith,
      (c1) wherein said sensor receiver is non-diffracting and optically conductive,
      (c2) wherein at least one of said receiving surfaces is in optical communication with at least one of said emitting surfaces,
      (c3) wherein at least a portion of any light emitted from said emitting surface is received by said receiving surface, and,
      (c4) wherein said sensor receiver and said sensor emitter are movable with respect to each other, wherein an amount of light received by said receiving surface varies with any such movement, and wherein said amount of light received by said receiving surface is representative of an amount of displacement between said emitting surface and said receiving surface; and,
   (d) a second optical line, said second optical line being in optical communication with said sensor receiver, said second optical line being at least for transmitting at least a portion of any light received by said receiving surface.

2. An apparatus according to claim 1, wherein said sensor receiver and said sensor emitter are both a same size.

3. An apparatus according to claim 1, wherein said sensor receiver and said sensor emitter are both a same size square.

4. An apparatus according to claim 1, wherein said receiving surface has a plurality of different colored regions thereon, each of said plurality of different colored regions permitting light of a different limited wavelength band to pass therethrough and to said second optical conduit.

5. An apparatus according to claim 1, wherein said emitting surface and said receiving surface are substantially parallel with each other.

6. An apparatus according to claim 1, further comprising:
   (e) at least one photo sensitive element in optical communication with said second optical line, said photosensitive element for converting at least a portion of any light transmitted from said receiving surface into an electronic signal.

7. An apparatus according to claim 6, wherein said sensor receiver receiving surface includes a plurality of regions thereon, each of said different regions permitting a different frequency band of light to pass therethrough.

8. An apparatus according to claim 7, wherein there are a plurality of photo sensitive elements in optical communication with said second optical line, and wherein each of said plurality of photo sensitive elements is responsive to a different band of light frequencies.

9. An optical displacement sensor, comprising:
   (a) a first optical line, said first optical line being positionable to be in optical communication with at least one illumination source;
   (b) a sensor emitter, said sensor emitter having at least one emitting surface,
      (b1) wherein said sensor emitter is in optical communication with said first optical line,
      (b2) wherein said sensor emitter is non-diffracting and optically conductive, and (b3) wherein at least a portion of any light originating from said illumination source is emitted from said at least one emitting surfaces;

(c) a sensor receiver, said sensor receiver having at least one receiving region, said sensor receiver being positioned to be proximate to said sensor emitter and in optical communication therewith, (c1) wherein said sensor receiver is non-diffracting and optically conductive, (c2) wherein at least one of said receiving regions is in optical communication with at least one of said emitting surfaces, (c3) wherein at least a portion of any light emitted from said emitting surface is received by at least one of said receiving regions, and, (c4) wherein said sensor receiver and said sensor emitter are movable with respect to each other, wherein an amount of light received by said receiving region varies with any such movement, and wherein said amount of light received by said receiving surface is representative of an amount of displacement between said emitting surface and said receiving surface; and, (d) at least one sensing optical line, said sensing optical line being in optical communication with said sensor receiver, said sensing optical line being at least for transmitting at least a portion of any light received by said receiving surface.

10. An apparatus according to claim 9, wherein there are a plurality of receiving regions on said receiving surface and wherein there are a corresponding plurality of sensing optical lines, each of said plurality of sensing optical lines being in optical communication with at least one of said receiving regions.

11. An apparatus according to claim 10, wherein each of said sensing optical lines is in optical communication with a photosensitive element, each of said photosensitive elements for converting at least a portion of any light transmitted from said receiving surface into an electronic signal.

12. An optical displacement sensor, comprising:

(a) a first optical line, said first optical line being positionable to be in optical communication with an illumination source;

(b) a non-diffracting and substantially translucent sensor emitter, said sensor emitter having at least one emitting surface, (b1) wherein said sensor emitter is in optical communication with said first optical line, (b2) wherein said sensor emitter is optically conductive, and, (b3) wherein at least a portion of any light originating from said illumination source is emitted from said at least one emitting surfaces;

(c) a non-diffracting and substantially translucent sensor receiver, said sensor receiver having at least one receiving surface, said sensor receiver being positioned to be proximate to said sensor emitter and in optical communication therewith, (c1) wherein said sensor receiver is optically conductive, (c2) wherein at least one of said receiving surfaces is in optical communication with at least one of said emitting surfaces, (c3) wherein at least a portion of any light emitted from said emitting surface is received by said receiving surface, and, (c4) wherein said sensor receiver and said sensor emitter are movable with respect to each other, wherein a magnitude of light received by said receiving surface varies with any such movement, and wherein said magnitude light received by said receiving surface is representative of an amount of displacement between said emitting surface and said receiving surface; and, (d) a second optical line, said second optical line being in optical communication with said sensor receiver, said second optical line being at least for transmitting at least a portion of any light received by said receiving surface.

13. An apparatus according to claim 12, wherein said sensor receiver and said sensor emitter are both a same size.

14. An apparatus according to claim 12, wherein said sensor receiver and said sensor emitter are both a same size square.

15. An apparatus according to claim 12, wherein said receiving surface has a plurality of different colored regions thereon, each of said plurality of different colored regions permitting light of a different limited wavelength band to pass therethrough and to said second optical conduit.

16. An apparatus according to claim 12, wherein said emitting surface and said receiving surface are substantially parallel with each other.

17. An apparatus according to claim 12, farther comprising:

(e) at least one photo sensitive element in optical communication with said second optical line, said photosensitive element for converting at least a portion of any light transmitted from said receiving surface into an electronic signal.

18. An apparatus according to claim 17, wherein said sensor receiver receiving surface includes a plurality of regions thereon, each of said different regions permitting a different frequency band of light to pass therethrough.

19. An apparatus according to claim 12, wherein there are a plurality of photo sensitive elements in optical communication with said second optical line, and wherein each of said plurality of photo sensitive elements is responsive to a different band of light frequencies.

* * * * *